US008855188B2

(12) United States Patent
Segall et al.

(10) Patent No.: US 8,855,188 B2
(45) Date of Patent: *Oct. 7, 2014

(54) METHOD OF PARALLEL VIDEO CODING BASED ON MAPPING

(75) Inventors: Christopher A. Segall, Camas, WA (US); Jie Zhao, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/837,447

(22) Filed: Jul. 15, 2010

(65) Prior Publication Data

US 2012/0014440 A1 Jan. 19, 2012

(51) Int. Cl.
*H04N 11/02* (2006.01)
*H04N 19/61* (2014.01)
*H04N 19/70* (2014.01)
*H04N 19/593* (2014.01)
*H04N 19/436* (2014.01)
*H04N 19/46* (2014.01)
*H04N 19/176* (2014.01)
*H04N 19/102* (2014.01)
*H04N 19/44* (2014.01)
*H04N 19/88* (2014.01)
*H04N 19/136* (2014.01)
*H04N 19/00* (2014.01)

(52) U.S. Cl.
CPC ......... *H04N 7/345* (2013.01); *H04N 19/00781* (2013.01); *H04N 19/00884* (2013.01); *H04N 19/00521* (2013.01); *H04N 19/00545* (2013.01); *H04N 19/00278* (2013.01); *H04N 19/00012* (2013.01); *H04N 19/00763* (2013.01); *H04N 19/00533* (2013.01); *H04N 19/00927* (2013.01); *H04N 19/00139* (2013.01); *H04N 7/26335* (2013.01); *H04N 7/26755* (2013.01)
USPC ........................................................ 375/240

(58) Field of Classification Search
CPC ............................ H04N 19/00072–19/00951
See application file for complete search history.

(56) References Cited

U.S. PATENT DOCUMENTS

| 7,215,707 | B2 * | 5/2007 | Lee et al. | 375/240.18 |
|---|---|---|---|---|
| 7,925,107 | B2 * | 4/2011 | Kim et al. | 382/248 |
| 8,144,789 | B2 * | 3/2012 | Tasaka et al. | 375/240.26 |
| 8,194,749 | B2 * | 6/2012 | Kim et al. | 375/240.24 |
| 8,406,299 | B2 * | 3/2013 | Karczewicz | 375/240.15 |
| 8,483,285 | B2 * | 7/2013 | Ye et al. | 375/240.24 |
| 8,559,738 | B2 * | 10/2013 | Guo et al. | 382/238 |
| 8,619,856 | B2 * | 12/2013 | Chen et al. | 375/240.12 |

(Continued)

FOREIGN PATENT DOCUMENTS

| EP | 2056606 A1 | 5/2009 |
|---|---|---|
| WO | 2008012918 A1 | 1/2008 |

OTHER PUBLICATIONS

International Search Report, mailed Nov. 1, 2011, Japanese International Patent App. No. PCT/JP2011/066631, filed Jul. 14, 2011, Sharp Kabushiki Kaisha, 7 pgs.

(Continued)

*Primary Examiner* — William C Vaughn, Jr.
*Assistant Examiner* — Luis M Perez
(74) *Attorney, Agent, or Firm* — Chernoff Vilhauer McClung & Stenzel, LLP

(57) ABSTRACT

A system encoding and decoding video that uses a parallel encoding and decoding technique.

15 Claims, 25 Drawing Sheets

AVAILABLE PREDICTIONS DIRECTIONS
IN THE ANGULAR MODE OF INTRA 8X8 MACROBLOCKS

(56) References Cited

U.S. PATENT DOCUMENTS

| | | | |
|---|---|---|---|
| 2005/0123207 A1* | 6/2005 | Marpe et al. ............... | 382/239 |
| 2006/0126730 A1 | 6/2006 | Arakawa et al. | |
| 2006/0222066 A1* | 10/2006 | Yoo et al. ............... | 375/240.03 |
| 2008/0056363 A1 | 3/2008 | Lyashevsky et al. | |
| 2008/0240253 A1 | 10/2008 | Au et al. | |
| 2008/0240254 A1 | 10/2008 | Au et al. | |
| 2008/0285644 A1 | 11/2008 | Seo et al. | |
| 2008/0310507 A1* | 12/2008 | Ye et al. ............... | 375/240.12 |
| 2009/0110067 A1* | 4/2009 | Sekiguchi et al. ....... | 375/240.12 |
| 2010/0086029 A1* | 4/2010 | Chen et al. ............ | 375/240.12 |
| 2010/0150242 A1* | 6/2010 | Ozawa ................... | 375/240.16 |
| 2010/0329362 A1* | 12/2010 | Choi et al. ............. | 375/240.29 |
| 2011/0176615 A1* | 7/2011 | Lee et al. ............... | 375/240.16 |
| 2011/0243471 A1* | 10/2011 | Alshina et al. ........... | 382/248 |
| 2011/0310973 A1* | 12/2011 | Cheon et al. ............ | 375/240.18 |
| 2012/0230424 A1* | 9/2012 | Duvivier ................ | 375/240.24 |

OTHER PUBLICATIONS

Segall et al., "A Highly Efficient and Highly Parallel System for Video Coding," Joint Collaborative Team on Video Coding (JCT-VC) of ITU-T SG16 WP3 and ISO/IEC JTC1/SC29/WG11 1st Meeting: Dresden, DE, Apr. 15-23, 2010, pp. 1, 12-23.

International Search Report, mailed Nov. 1, 2011, Japanese International Patent App. No. PCT/JP2011/066637, filed Jul. 14, 2011, Sharp Kabushiki Kaisha, 7 pgs.

International Search Report, mailed Nov. 1, 2011, Japanese International Patent App. No. PCT/JP2011/066625, filed Jul. 14, 2011, Sharp Kabushiki Kaisha, 7 pgs.

International Search Report, mailed Nov. 1, 2011, Japanese International Patent App. No. PCT/JP2011/066635, filed Jul. 14, 2011, Sharp Kabushiki Kaisha, 7 pgs.

International Search Report, mailed Nov. 1, 2011, Japanese International Patent App. No. PCT/JP2011/066632, filed Jul. 14, 2011, Sharp Kabushiki Kaisha, 8 pgs.

International Search Report, mailed Nov. 1, 2011, Japanese International Patent App. No. PCT/JP2011/066624, filed Jul. 14, 2011, Sharp Kabushiki Kaisha, 8 pgs.

Davies, "BBC's Response to the Call for Proposals on Video Compression Technology," Joint Collaborative Team on Video Coding (JCT-VC) of ITU-T SG16 WP3 and ISO/IEC JTC1/SC29/WG11 1st Meeting: Dresden, DE, Apr. 15-23, 2010, pp. 1, 13-16.

* cited by examiner

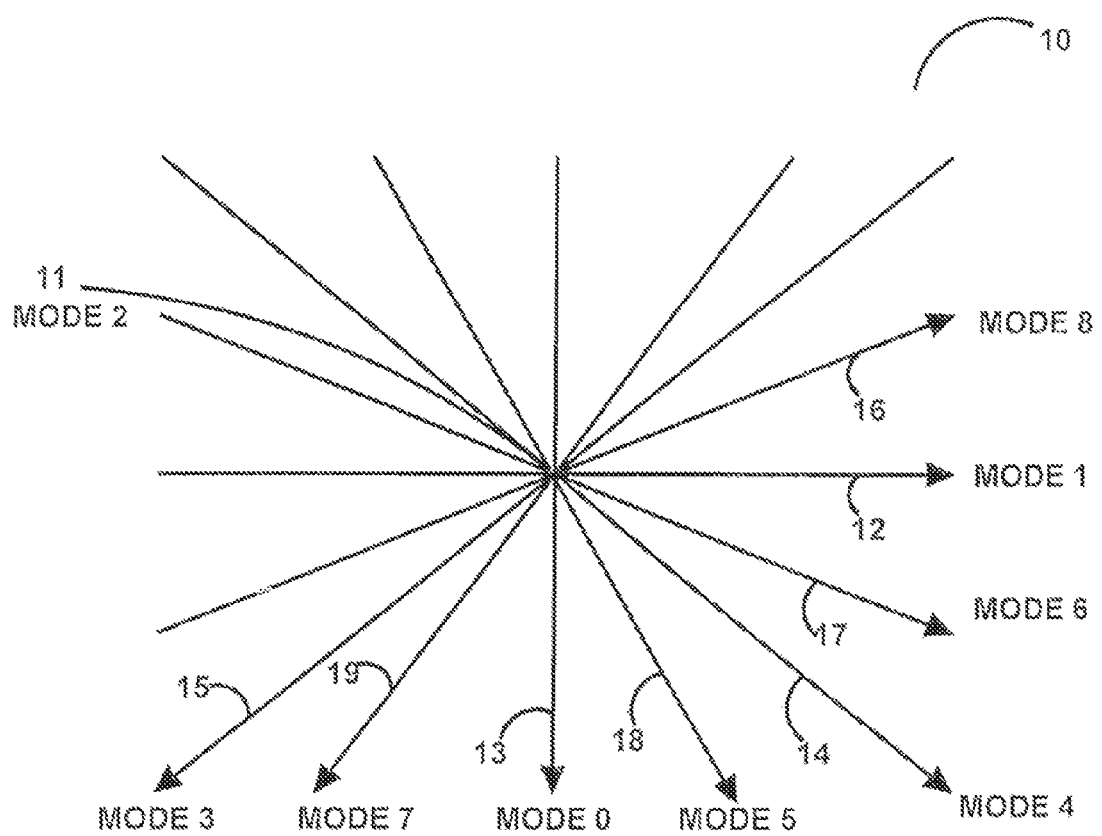
FIG. 2 - PRIOR ART

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

FIG. 3A - PRIOR ART

| M | A | B | C | D | E | F | G | H |
|---|---|---|---|---|---|---|---|---|
| I | A | B | C | D | | | | |
| J | A | B | C | D | | | | |
| K | A | B | C | D | | | | |
| L | A | B | C | D | | | | |

| 61 | 62 | 63 | 64 |
|----|----|----|----|
| 65 | 66 | 67 | 68 |
| 69 | 70 | 71 | 72 |
| 73 | 74 | 75 | 76 |

FIG. 5A

| 81 | 82 | 83 | 84 |
|----|----|----|----|
| 85 | 86 | 87 | 88 |
| 89 | 90 | 91 | 92 |
| 93 | 94 | 95 | 96 |

FIG. 5B

| 101 | 102 | 103 | 104 |
|-----|-----|-----|-----|
| 105 | 106 | 107 | 108 |
| 109 | 110 | 111 | 112 |
| 113 | 114 | 115 | 116 |

FIG. 5C

| 121 | 122 | 123 | 124 |
|-----|-----|-----|-----|
| 125 | 126 | 127 | 128 |
| 129 | 130 | 131 | 132 |
| 133 | 134 | 135 | 136 |

FIG. 5D

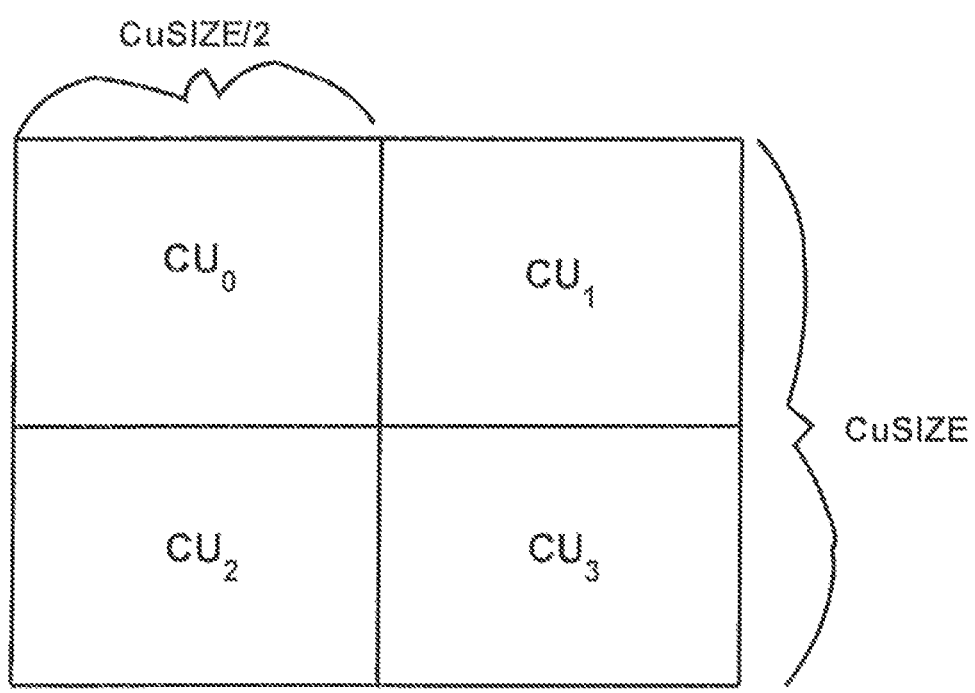
FIG. 8 - CODING UNIT SPLIT

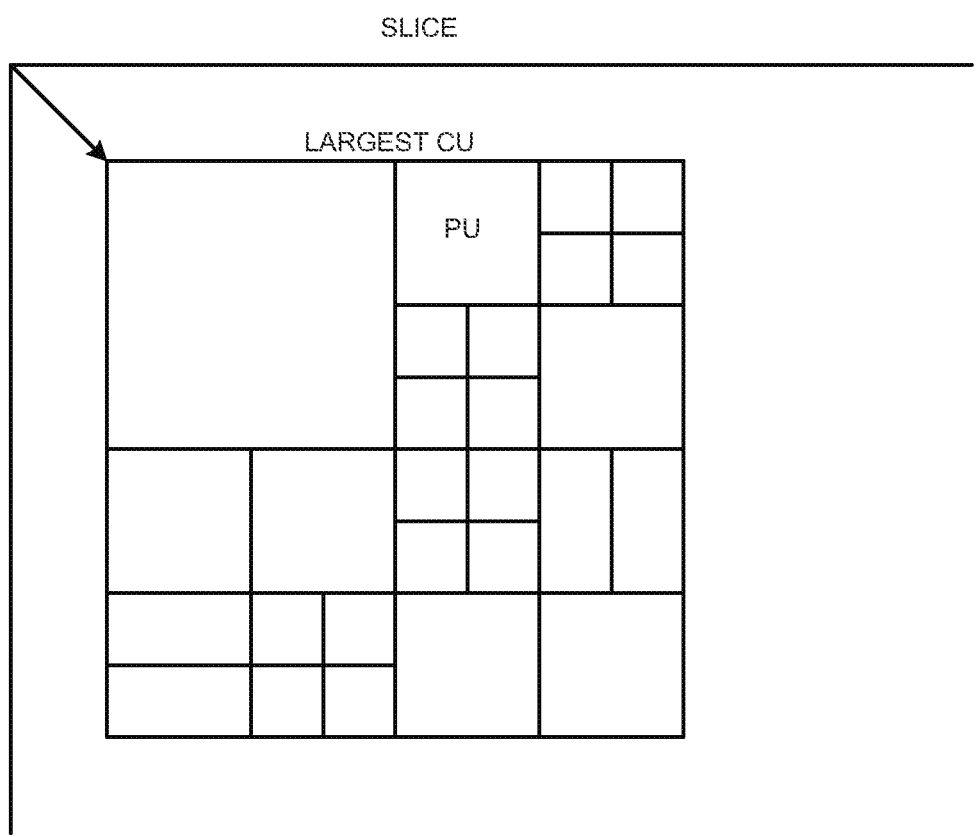
FIG. 9A SPATIAL SUBDIVISION OF THE SLICE USING VARIOUS
UNITS AND INDICES

EXAMPLE OF ONE PREDICTION UNIT
WITH INTRA_SPLIT_FLAG

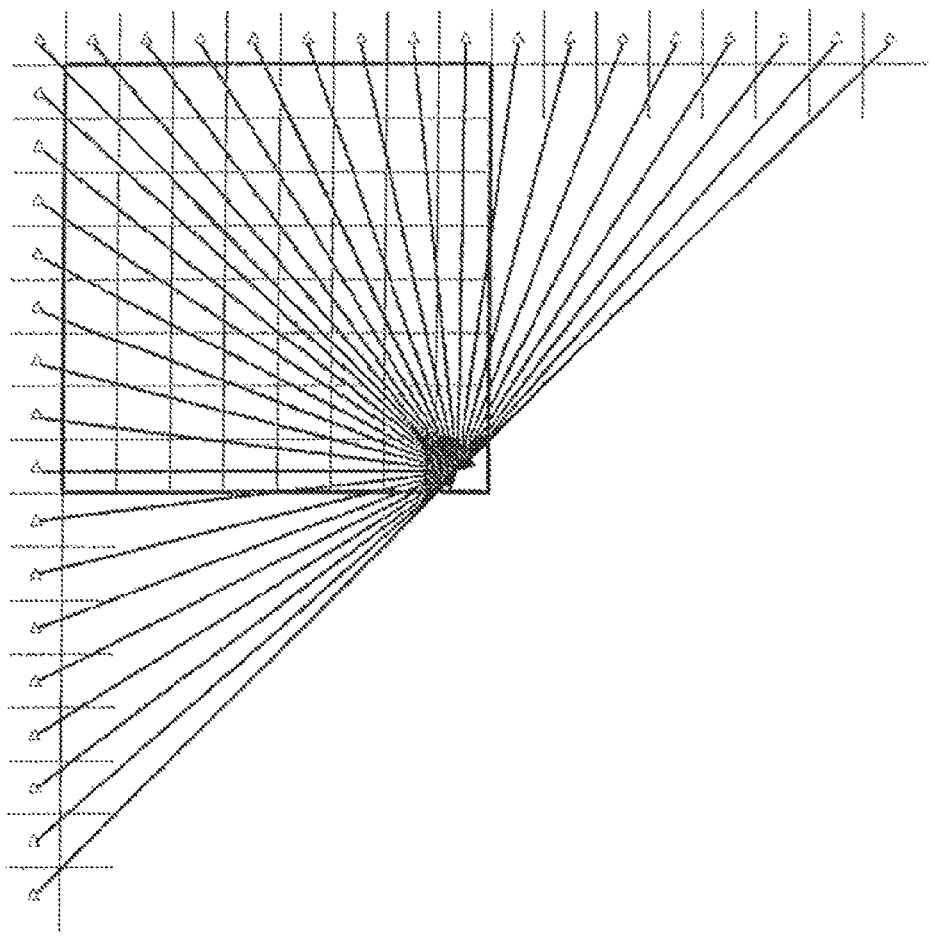
FIG. 15 AVAILABLE PREDICTIONS DIRECTIONS IN THE ANGULAR MODE OF INTRA 8X8 MACROBLOCKS

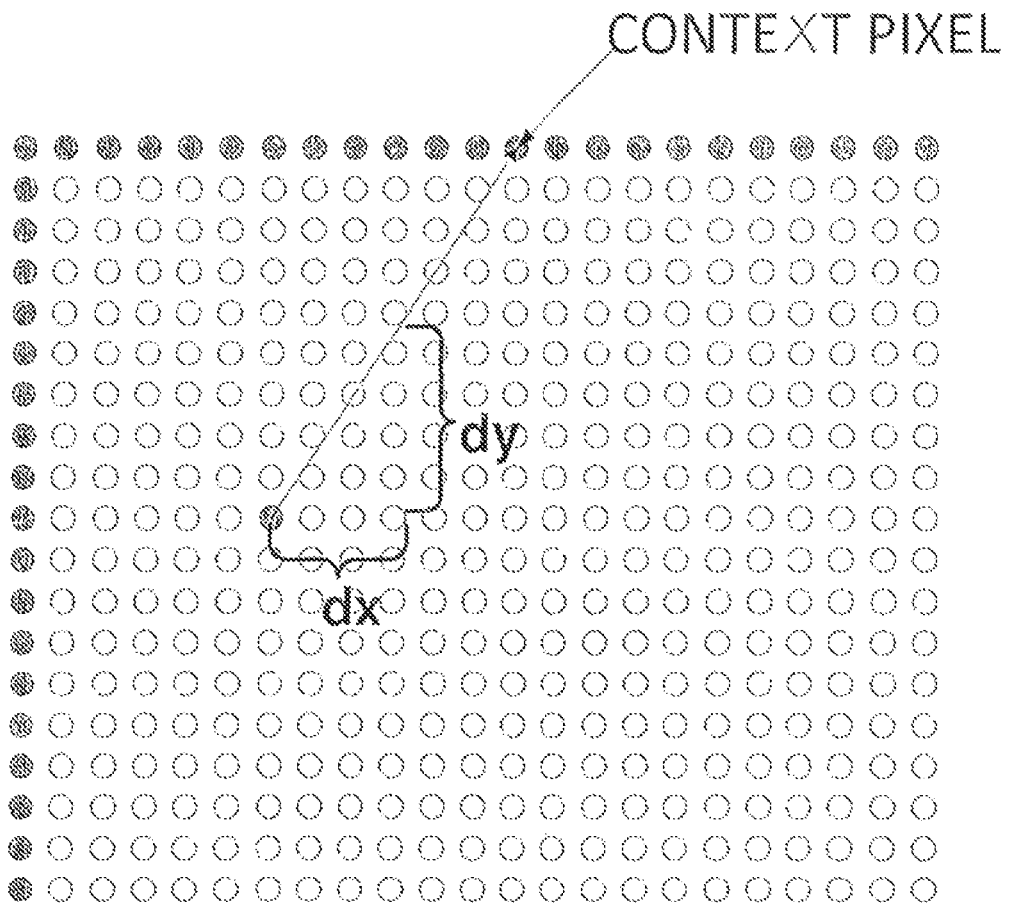
FIG. 16 ARBITRARY DIRECTIONAL INTRA PREDICTION
DEFINED BY (dx, dy)

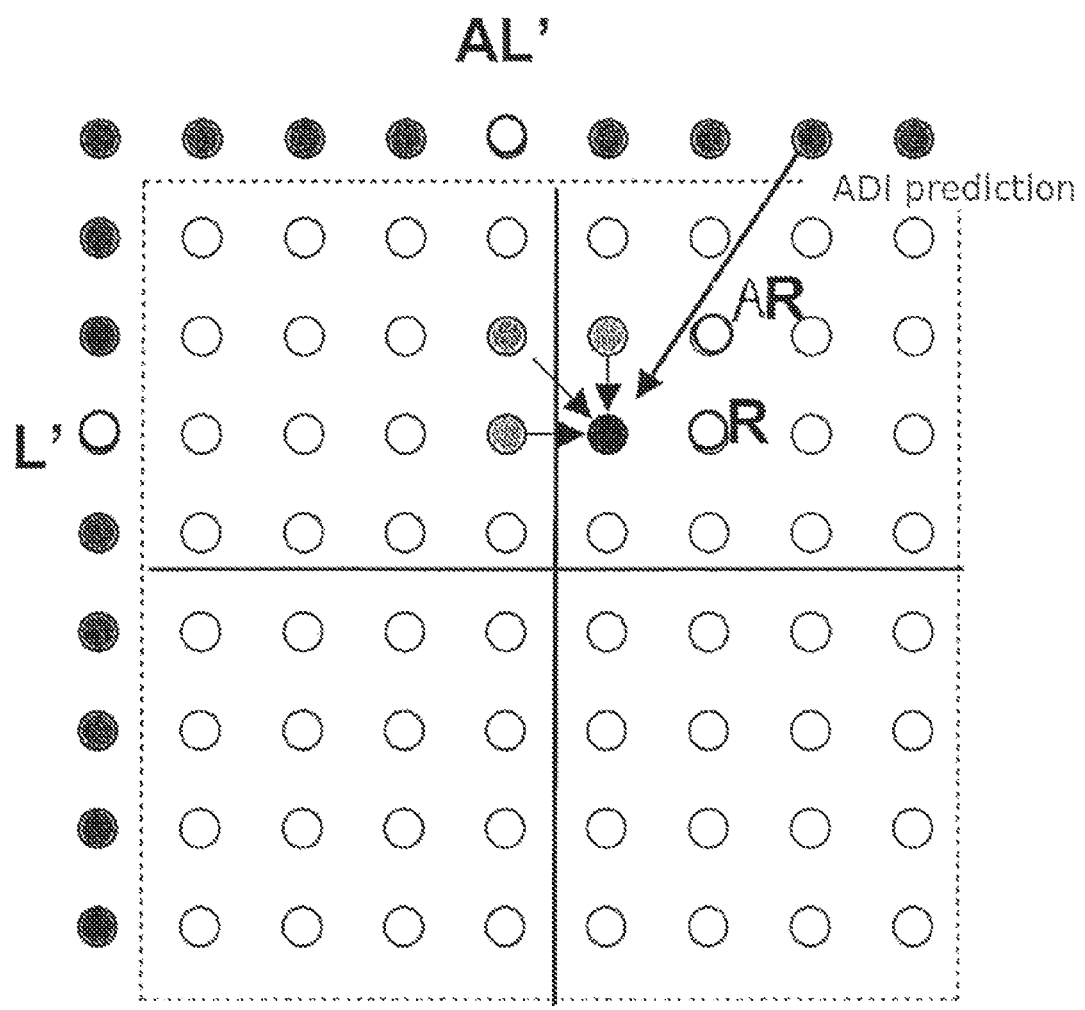
FIG. 17 - PIXELS FOR COMBINED INTRA PREDICTION AND PARALLEL INTRA PREDICTION

METHOD OF PARALLEL VIDEO CODING BASED ON MAPPING

CROSS-REFERENCE TO RELATED APPLICATIONS

None

BACKGROUND OF THE INVENTION

The present invention relates to a system for parallel video coding techniques.

Existing video coding standards, such as H.264/AVC, generally provide relatively high coding efficiency at the expense of increased computational complexity. As the computational complexity increases, the encoding and/or decoding speeds tend to decrease. The use of parallel decoding and parallel encoding may improved the decoding and encoding speeds, respectively, particularly for multi-core processors. Also, parallel prediction patterns that depend solely on the number of prediction units within the block may be problematic for coding systems using other block structures because the number of prediction units may no longer correspond to the spatial size of the prediction unit.

BRIEF DESCRIPTION OF THE SEVERAL VIEWS OF THE DRAWINGS

FIG. 2 illustrates prediction modes.
FIGS. 3A-3I illustrates intra-prediction modes.
FIG. 4 illustrates a 16 block macroblock with two partition groups.
FIGS. 5A-5D illustrate macroblocks with two partition groups.
FIG. 8 illustrates a coding unit split.
FIG. 9A illustrates spatial subdivision of a slice using various units and indices.
FIG. 15 illustrates prediction direction in the angular mode of intra 8×8 macrobocks.
FIG. 16 illustrates arbitrary directional intra prediction modes defined by (dx, dy).
FIG. 17 illustrates pixels for combined intra prediction and parallel intra prediction.

DETAILED DESCRIPTION OF PREFERRED EMBODIMENT

Intra-prediction based video encoding/decoding exploits spatial relationships within a frame, an image, or otherwise a block/group of pixels. At an encoder, a block of pixels may be predicted from neighboring previously encoded blocks of pixels, generally referred to as reconstructed blocks, typically located above and/or to the left of the current block, together with a prediction mode and a prediction residual for the block. A block may be any group of pixels that preferably shares the same prediction mode, the prediction parameters, the residual data and/or any other signaled data. At a decoder, a current block may be predicted, according to the prediction mode, from neighboring reconstructed blocks typically located above and/or to the left of the current block, together with the decoded prediction residual for the block. In many cases, the intra prediction uses, for example, 4×4, 8×8, and 16×16 blocks of pixels.

Figure 1:
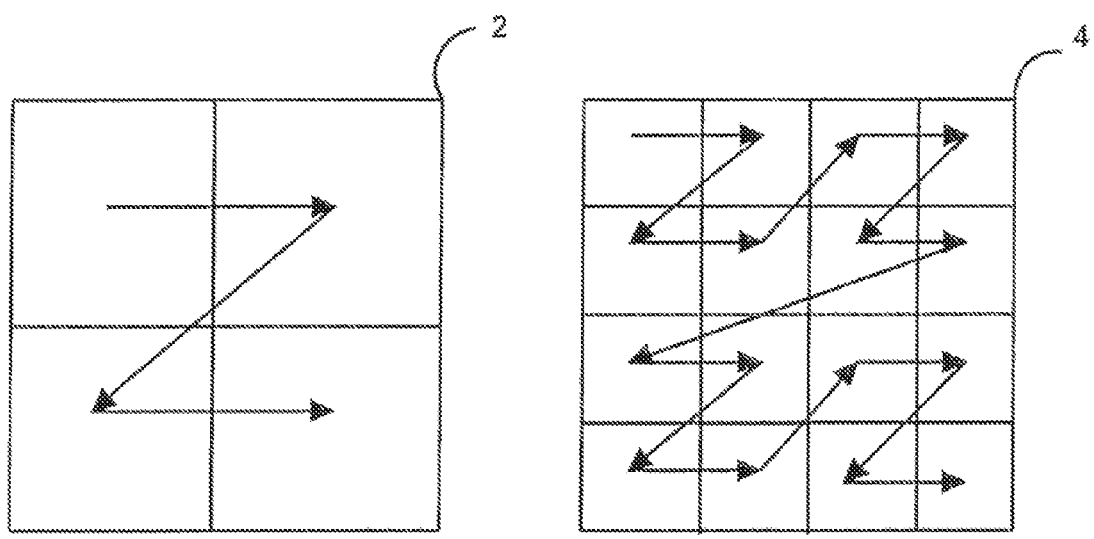
FIG. 1 illustrates encoding patterns.

Referring to FIG. 1, with respect to the H.264/AVC video encoding standard, a 16×16 macroblock may include four 8×8 blocks or sixteen 4×4 blocks. The processing order for a group of four 8×8 blocks 2 of a 16×16 macroblock and for a group of sixteen 4×4 blocks 4 of a 16×16 macroblock may have a zig-zag processing order, or any other suitable order. Typically, the current block within the macroblock being reconstructed is predicted using previously reconstructed neighboring blocks and/or macroblocks. Accordingly, the processing of one or more previous blocks of a 16×16 macroblock is completed before other blocks may be reconstructed using its neighbors within the macroblock. The intra 4×4 prediction has more serial dependency in comparison to intra 8×8 and 16×16 prediction. This serial dependency may increase the number of operating cycles within a processor therefore slowing down the time to complete the intra prediction, and may result in an uneven throughput of different intra prediction types.

Referring to FIG. 2, in H.264/AVC, the intra 4×4 prediction and 8×8 prediction have nine prediction modes 10. Pixel values in the current block may be predicted from pixels values in a reconstructed upper and/or left neighboring block (s) relative to the current block. The direction of the arrow depicting a mode indicates the prediction direction for the mode. The center point 11 does not represent a direction so this point may be associated with a DC prediction mode, or otherwise referred to as "mode 2". A horizontal arrow 12 extending to the right from the center point 11 may represent a horizontal prediction mode, also referred to as "mode 1". A vertical arrow 13 extending down from the center point 11 may represent a vertical prediction mode, also referred to as "mode 0". An arrow 14 extending from the center point 11 diagonally downward to the right at approximately a 45 degree angle from horizontal may represent a diagonal down-right (DDR) prediction mode, also referred to as "mode 4". An arrow 15 extended from the center point 11 diagonally downward to the left at approximately a 45 degree angle from horizontal may represent a diagonal down-left (DDL) prediction mode, also referred to as "mode 3". Both the DDR and DDL prediction modes may be referred to as diagonal prediction modes. An arrow 16 extending from the center point 11 diagonally upward to the right at approximately a 22.5 degree angle from horizontal may represent a horizontal up (HU) prediction mode, also referred to as "mode 8". An arrow 17 extending from the center point 11 diagonally downward to the right at approximately a 22.5 degree angle from horizontal may represent a horizontal down (HD) prediction mode, also referred to as "mode 6". An arrow 18 extending from the center point 11 diagonally downward to the right at approximately a 67.5 degree angle from horizontal may represent a vertical down right (VR) prediction mode, also referred to as "mode 5". An arrow 19 extending from the center point 11 diagonally downward to the left at approximately a 67.5 degree angle from horizontal may represent a vertical down left (VL) prediction mode, also referred to as "mode 7". The HU, HD, VR, and VL prediction modes may be referred to collectively as intermediate angle prediction modes.

FIG. 3A illustrates an exemplary 4×4 block 20 of samples, labeled a-p that may be predicted from reconstructed, neighboring samples, labeled A-M. When samples are not available, such as for example when E-H are not available, they may be replaced by other suitable values.

Intra-prediction mode 0 (prediction mode direction indicated as 13 in FIG. 2) may be referred to as vertical mode intra prediction. In mode 0, or vertical mode intra prediction, the samples of a current block may be predicted in the vertical direction from the reconstructed samples in the block above the current block. In FIG. 3B, the samples labeled a-p in FIG. 3A are shown replaced with the label of the sample label from FIG. 3A from which they are predicted.

Figures 3C, 3D:
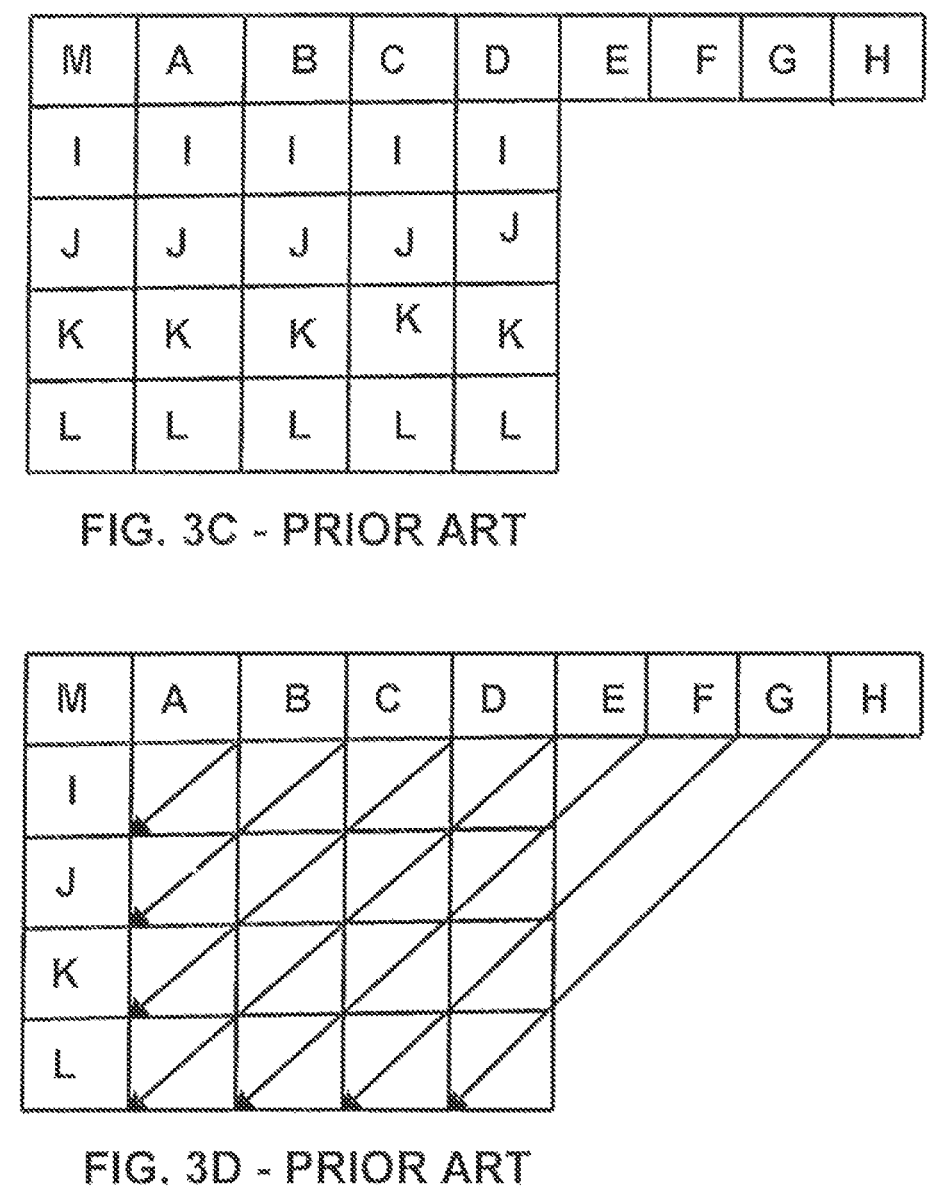

Intra-prediction mode 1 (prediction mode direction indicated as 12 in FIG. 2) may be referred to as horizontal mode intra prediction. In mode 1, or horizontal mode intra prediction, the samples of a block may be predicted in the horizontal direction from the reconstructed samples in the block to the left of the current block. FIG. 3C illustrates an exemplary horizontal prediction of the samples in a 4×4 block. In FIG. 3C, the samples labeled a-p in FIG. 3A are shown replaced with the label of the sample label from FIG. 3A from which they are predicted.

Intra-prediction mode 3 (prediction mode direction indicated as 15 in FIG. 2) may be referred to as diagonal down left mode intra prediction. In mode 3, the samples of a block may be predicted from neighboring blocks in the direction shown in FIG. 3D.

Figures 3E, 3F:
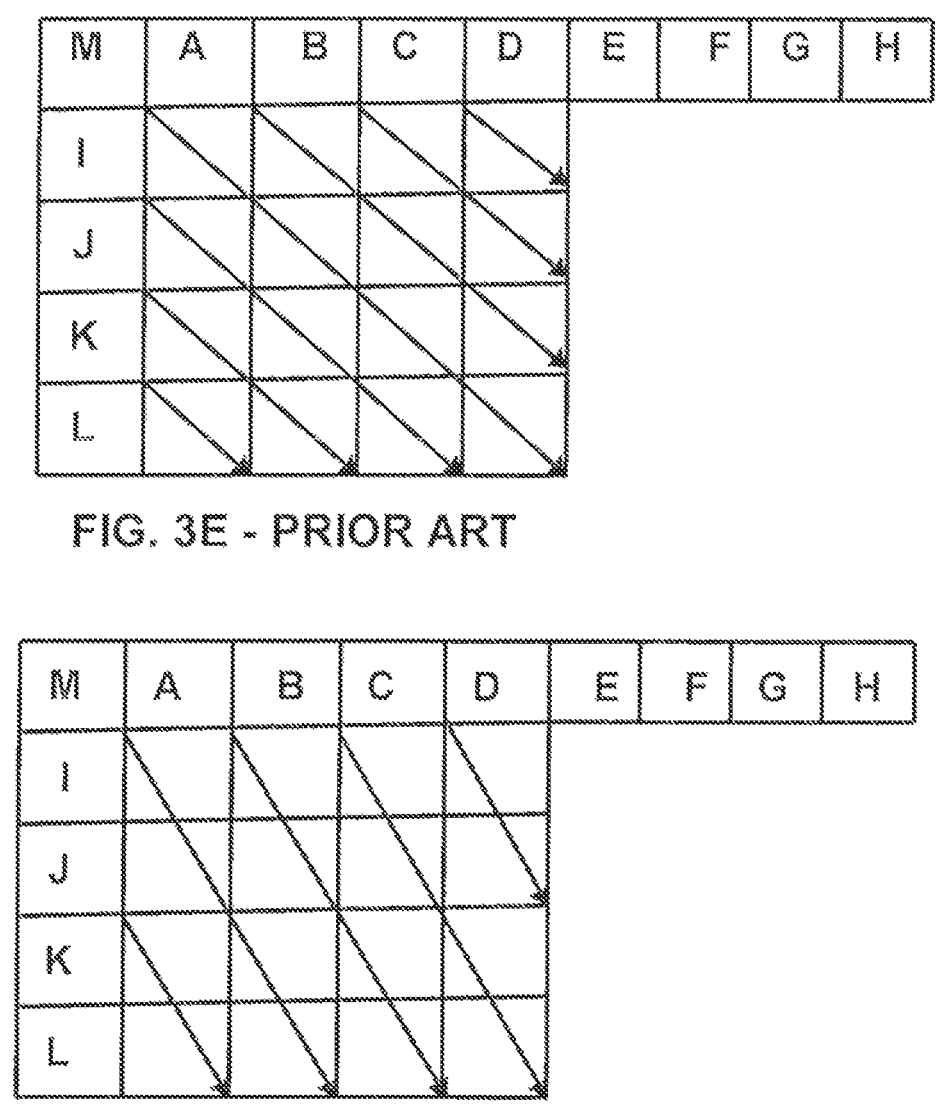

Intra-prediction mode 4 (prediction mode direction indicated as 14 in FIG. 2) may be referred to as diagonal down right mode intra prediction. In mode 4, the samples of a block may be predicted from neighboring blocks in the direction shown in FIG. 3E.

Intra-prediction mode 5 (prediction mode direction indicated as 18 in FIG. 2) may be referred to as vertical right mode intra prediction. In mode 5, the samples of a block may be predicted from neighboring blocks in the direction shown in FIG. 3F.

Figures 3G, 3H:
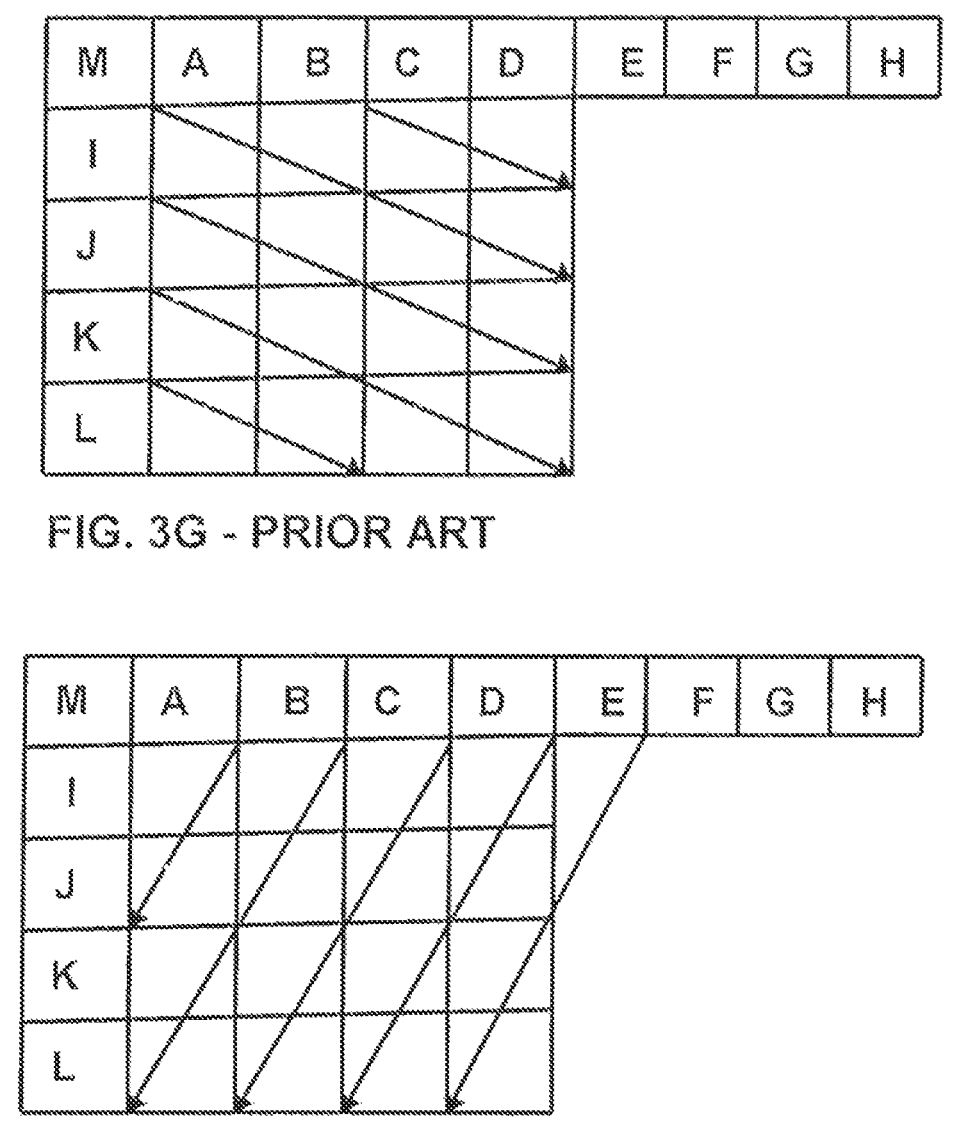

Intra-prediction mode 6 (prediction mode direction indicated as 17 in FIG. 2) may be referred to as horizontal down mode intra prediction. In mode 6, the samples of a block may be predicted from neighboring blocks in the direction shown in FIG. 3G.

Intra-prediction mode 7 (prediction mode direction indicated as 19 in FIG. 2) may be referred to as vertical left mode intra prediction. In mode 7, the samples of a block may be predicted from neighboring blocks in the direction shown in FIG. 3H.

Figure 3I:
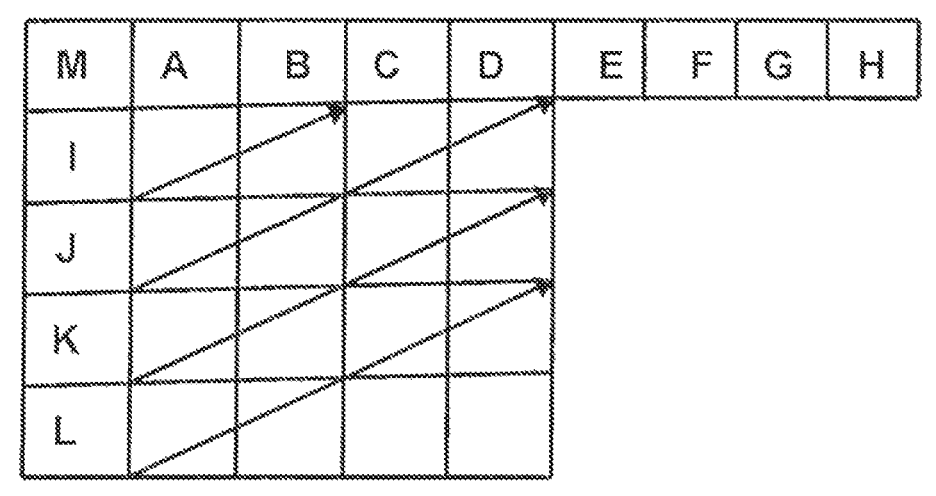

Intra-prediction mode 8 (prediction mode direction indicated as 16 in FIG. 2) may be referred to as horizontal up mode intra prediction. In mode 8, the samples of a block may be predicted from neighboring blocks in the direction shown in FIG. 3I.

In intra-prediction mode 2, which may be referred to as DC mode, all samples labeled a-p in FIG. 3A may be replaced with the average of the samples labeled A-D and I-L in FIG. 3A.

The system may likewise support four 16×16 intra prediction modes in which the 16×16 samples of the macroblock are extrapolated from the upper and/or left hand encoded and reconstructed samples adjacent to the macroblock. The samples may be extrapolated vertically, mode 0 (similar to mode 0 for the 4×4 size block), or the samples may be extrapolated horizontally, mode 1 (similar to mode 1 for the 4×4 size block). The samples may be replaced by the mean, mode 2 (similar to the DC mode for the 4×4 size block), or a mode 3, referred to as plane mode, may be used in which a linear plane function is fitted to the upper and left hand samples.

In order to decrease the processing delays, especially when using parallel processors, it is desirable to process selected blocks of pixels of a larger group of pixels, such as a macroblock, in a parallel fashion. A first group of blocks of pixels may be selected from a macroblock (or other larger set of pixels) and a second group of blocks of pixels may be selected from the remaining pixels of the macroblock. Additional or alternative groups of blocks of pixels may be selected, as desired. A block of pixels may be any size, such as an m×n size block of pixels, where m and n may be any suitable number. Preferably, each of the blocks within the first plurality of blocks are encoded using reconstructed pixel values from only one or more previously encoded neighboring macroblocks, and each of the blocks within the second plurality of blocks may be encoded using the reconstructed pixel values from previously encoded macroblocks and/or blocks associated with the first plurality of blocks. In this manner, the blocks within the first plurality of blocks may be decoded using reconstructed pixel values from only neighboring macroblocks, and then the blocks within the second plurality of blocks may be decoded using the reconstructed pixel values from reconstructed blocks associated with the first plurality of blocks and/or neighboring macroblocks. The encoding and decoding of one or more blocks may be, fully or partially, done in a parallel fashion.

Figure 4:
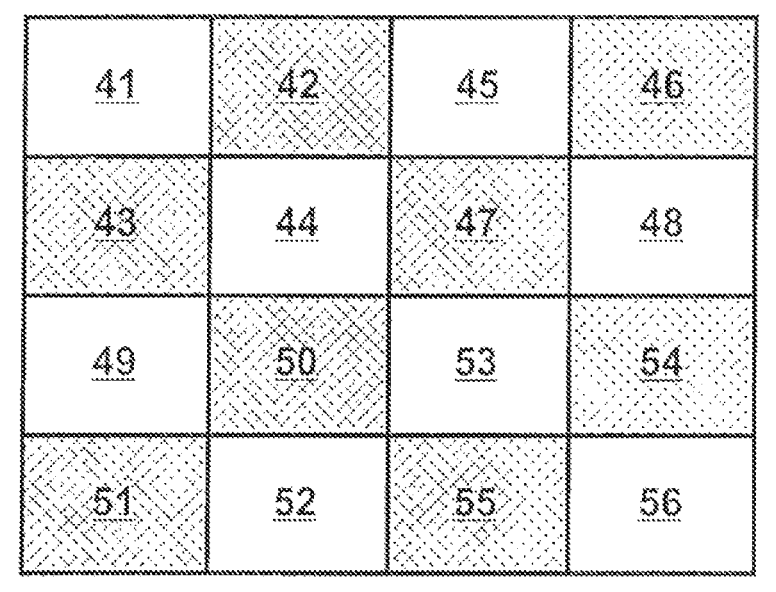

For example, a macroblock with N blocks, the degree of parallelism may be N/2. The increased speed of 4×4 intra prediction for a 16×16 macroblock may be generally around a factor of 8, which is significant. Referring to FIG. 4, a macroblock has a size of M×N, where M and N may be any suitable number. The sixteen blocks 41-56 may be grouped into two (or more) sets of eight blocks (or otherwise) each according to a check board pattern (or other pattern). Eight blocks in a first set are shown as 41, 44, 45, 48, 49, 52, 53, and 56, and the eight blocks shown in the other set are 42, 43, 46, 47, 50, 51, 54, and 55. The first set of blocks may be decoded, or encoded, in parallel using previously reconstructed macroblocks, and then the second set of blocks may be decoded, or encoded, in parallel using the reconstructed blocks associated with the first set and/or previously reconstructed macroblocks. In some cases, the second set of blocks may start being decoded before the first set of blocks are completely decoded.

Alternative partition examples are shown in FIGS. 5A-5D. Referring to FIG. 5A, blocks 61-76 may be grouped in two groups. The first group may include 61-64 and 69-72, while the second group may include 65-68 and 73-76. Referring to FIG. 5B, blocks 81-96 may be grouped in two groups. The first group may include 81, 84, 86, 87, 90, 91, 93, and 96, while the second group may include 82, 83, 85, 88, 89, 92, 94, and 95. Referring to FIG. 5C, blocks 101-116 may be grouped in two groups. The first group may include 101-108, while the second group may include 109-116. Referring to FIG. 5D, blocks 121-136 may be grouped in two groups. The first group may include 121, 123, 125, 127, 129, 131, 133, and 135, while the second group may include 122, 124, 126, 128, 130, 132, 134, and 136.

Alternatively, the macroblock may be partitioned into a greater number of partitions, such as three sets of blocks. Moreover, the partitions may have a different number of blocks. Further, the blocks may be the same or different sizes.

Figure 6A:
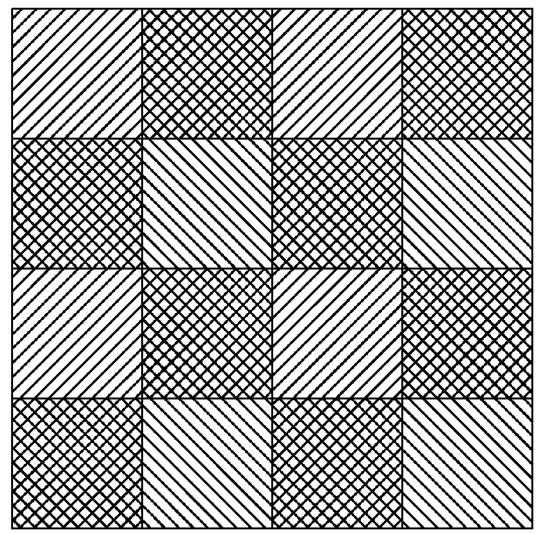
FIGS. 6A-6B illustrate macroblocks with three partition groups.
Figure 6B:
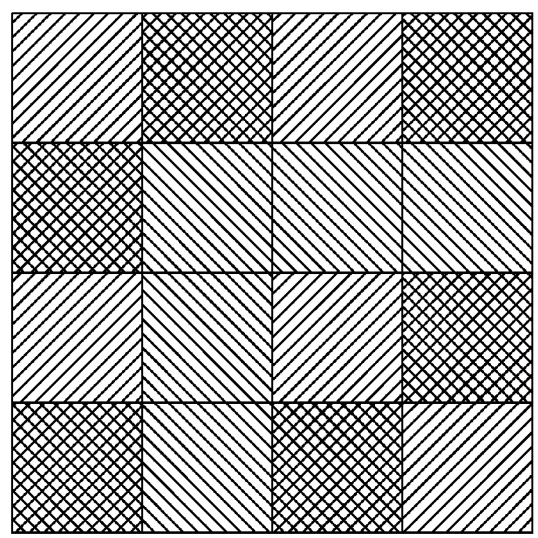
Figure 7:
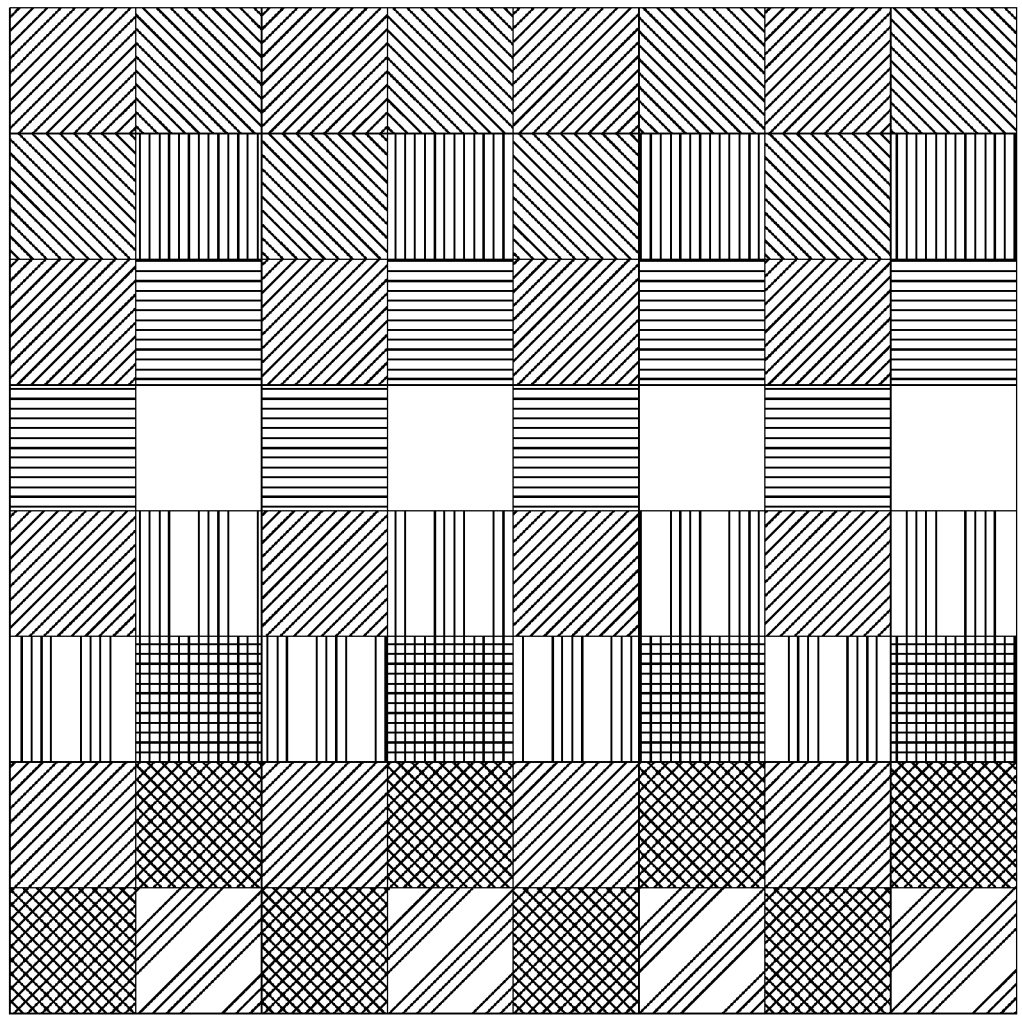
FIG. 7 illustrates a macroblock with multiple partition groups.

In general, a first plurality of blocks may be predicted in the encoding process using reconstructed pixel values from only previously encoded neighboring macroblocks. A second plurality of blocks may be subsequently predicted in the encoding process using reconstructed pixel values from the previously encoded blocks associated with the first plurality of blocks and/or using reconstructed pixel values from previously encoded neighboring macroblocks. The third plurality of blocks may be subsequently predicted in the encoding process using reconstructed pixel values from the previously encoded blocks associated with the first plurality of blocks, and/or reconstructed pixel values from the previously encoded blocks associated with the second plurality of blocks, and/or reconstructed pixel values from previously encoded neighboring macroblocks. FIGS. 6A and 6B depict exemplary three-group partitions of a 16×16 macroblock. FIG. 7 shows an exemplary partition of 4×4 blocks in a 32×32 macroblock.

The bit stream may require signaling which encoding pattern is used for the decoding, or otherwise the default decoding may be predefined.

In some embodiments, the neighboring upper and left macroblock pixel values may be weighted according to their distance to the block that is being predicted, or using any other suitable measure.

In some cases, the video encoding does not use fixed block sizes, but rather includes two or more different block sizes within a macroblock. In some implementations, the partitioning of an image may use the concepts of coding unit (CU), prediction unit (PU), and prediction partitions. At the highest level, this technique divides a picture into one or more slices. A slice is a sequence of largest coding units (LCU) that correspond to a spatial window within the picture. The coding unit, may be for example, a group of pixels containing one or more prediction modes/partitions and it may have residual data. The prediction unit, may be for example, a group of pixels that are predicted using the same prediction type, such as intra prediction or intra frame prediction. The prediction partition, may be for example, a group of pixels predicted using the same prediction type and prediction parameters. The largest coding unit, may be for example, a maximum number of pixels for a coding unit. For example, a 64×64 group of pixels may correspond to a largest coding unit. These largest coding units are optionally sub-divided to adapt to the underlying image content (and achieve efficient compression). This division is determined by an encoder and signaled to the decoder, and it may result in a quad-tree segmentation of the largest coding unit. The resulting partitions are called coding units, and these coding units may also be subsequently split. Coding unit of size CuSize may be split into four smaller coding units, CU0, CU1, CU2 and CU3 of size CuSize/2 as shown in FIG. 8. This is accomplished by signaling a split_coding_unit_flag to specify whether a coding unit is split into coding units with half horizontal and vertical size. The sub-division is recursive and results in a highly flexible partitioning approach.

Figure 9B:
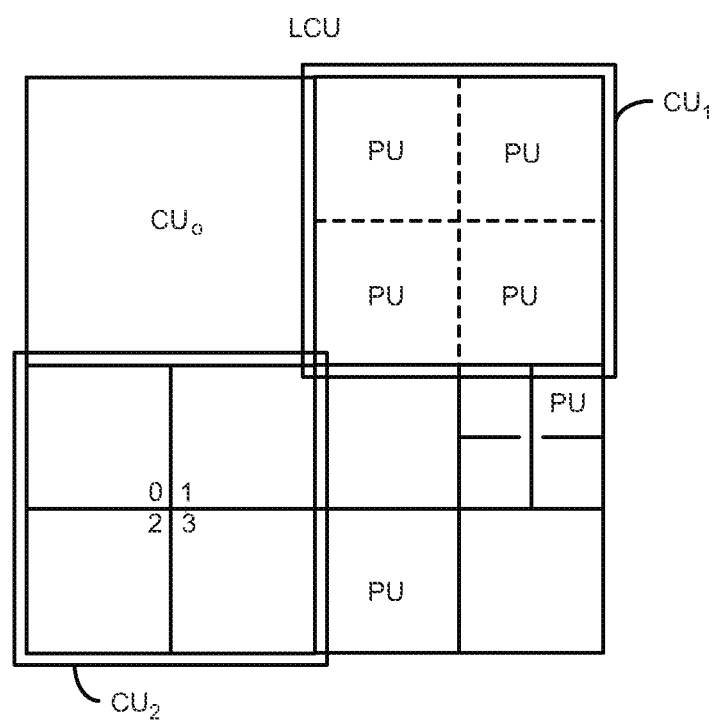
FIG. 9B illustrates spatial subdivisions of a largest coding unit suitable for intra-prediction

Once no further splitting of the coding unit is signaled, the coding units are considered as prediction units. Each prediction unit may have multiple prediction partitions. For an intra coded prediction unit, this may be accomplished by signaling an intra_split_flag to specify whether a prediction unit is split into four prediction units with half horizontal and vertical size. Additional partitioning mechanisms may be used for inter-coded blocks, as desired. FIG. 9A illustrates an example spatial subdivision of one slice with various units and their indices. FIG. 9B illustrates spatial subdivisions of a largest coding unit suitable for intra-prediction. In this case, the processing for multiple coding units are preferably done in parallel. In addition, the processing for multiple prediction units are preferably done in parallel, such as 0, 1, 2, 3, of CU2; and such as the 4 divisions of CU1.

With the additional capability of using such flexible block structures, where the number of prediction units no longer corresponds to the spatial size of the prediction unit, it was determined that limitations should be placed on whether such parallel encoding and/or parallel decoding mode should be used. For relatively large prediction partitions there does not tend to be a significant increase in parallelism from otherwise processing multiple prediction partitions sequentially. In addition, with different sized prediction units it would otherwise introduce significant computational complexity in order to accommodate a largest prediction (e.g., coding) unit with multiple different sized prediction units. Accordingly, it is desirable to only uses parallel encoding and/or decoding when the size of the blocks is less than a threshold size.

Figure 10:
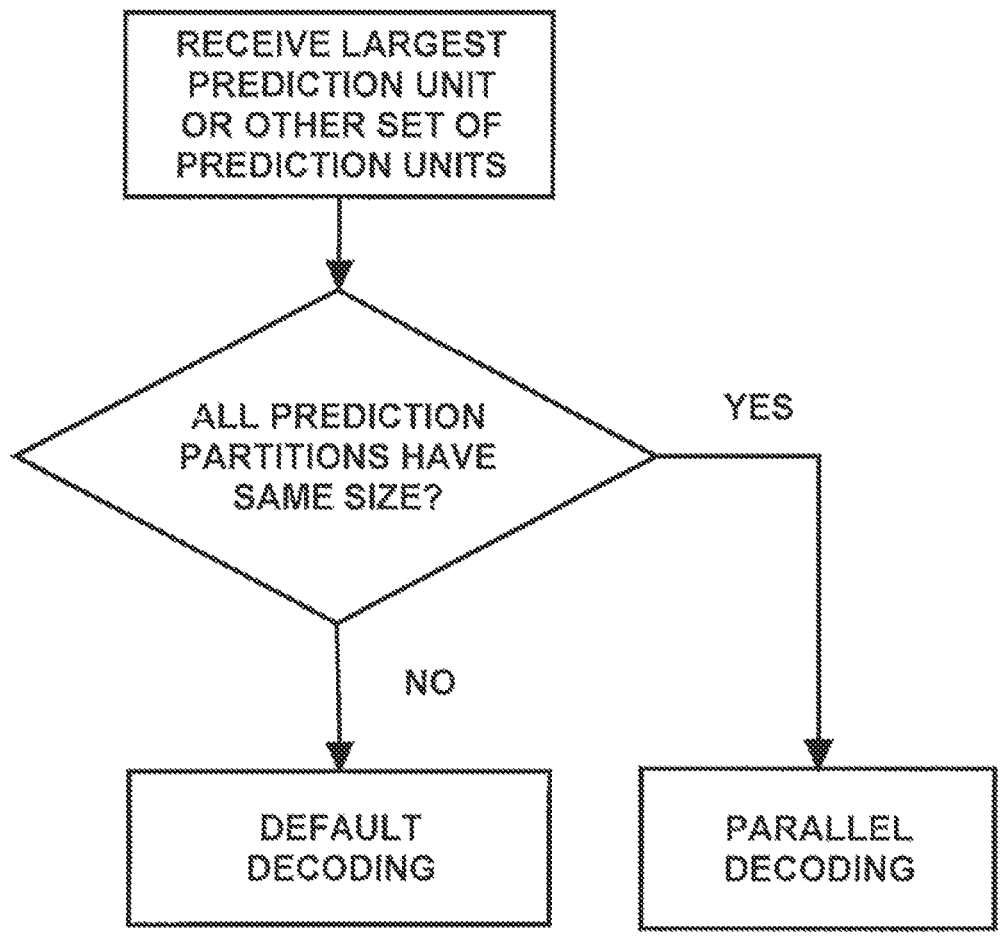
FIG. 10 illustrates size based parallel decoding.
Figure 11:
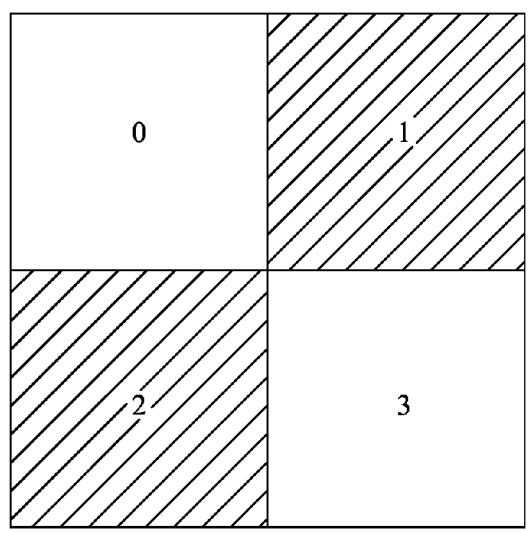
FIG. 11 illustrates one prediction unit with an intra_split_flag.

Referring to FIG. 10, preferably the system uses parallel intra prediction only for prediction units of the largest prediction unit that all contain partitions having the same size. The largest prediction unit, may be for example, the largest group of pixels being defined by a single set of data. This may be determined by inspection of the largest prediction unit, or other set of prediction units. That may be signaled from within the bitstream by a flag, such as an intra_split_flag, for the prediction unit. When the intra_split_flag signals that the prediction unit is sub-divided into equally sized prediction partitions, then the parallel intra prediction system may be applied within that prediction unit. When the intra_split_flag does not signal that the prediction unit is sub-divided into equally sized prediction partitions, then the parallel intra prediction system is preferably not applied. An exemplary splitting of the prediction unit into four prediction partitions is illustrated in FIG. 11, which are then grouped into two sets for parallel processing. For example, partitions 1 and 2 may be grouped to one set and partitions 0 and 3 may be grouped to another set. The first set is then predicted using the prediction unit neighbors while the second set is predicted using prediction unit neighbors as well as the neighbors in the first set.

Figure 12:
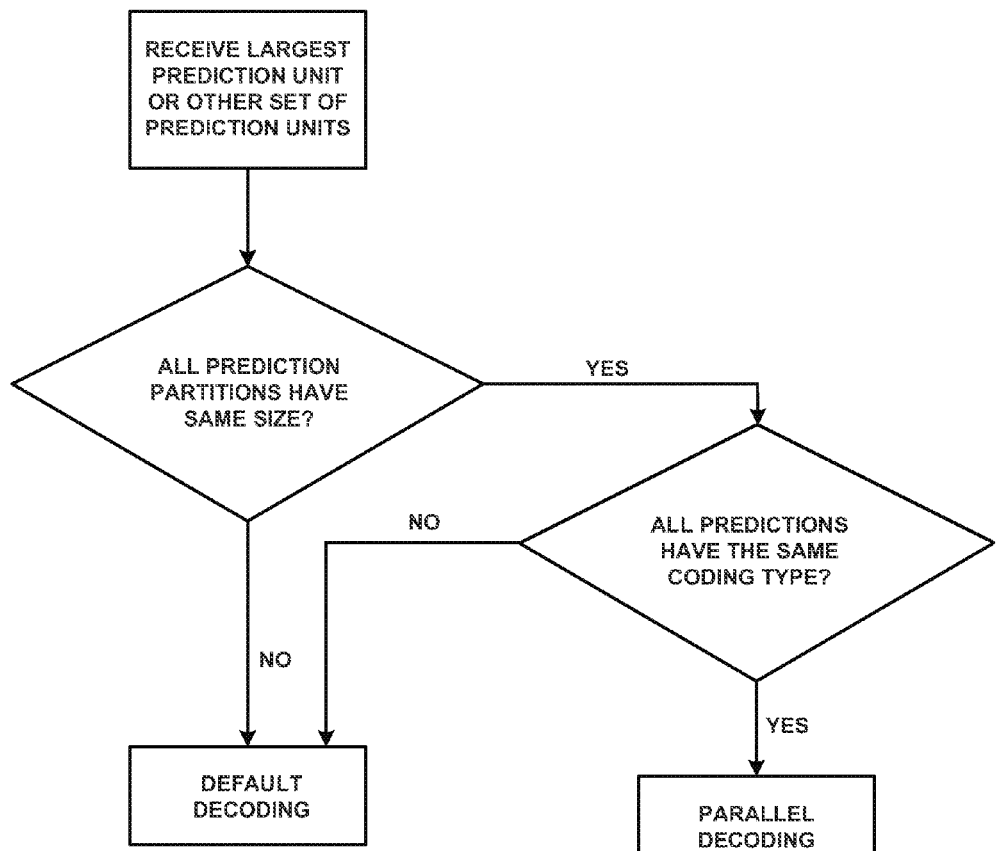
FIG. 12 illustrates type based parallel decoding.
Figure 13:
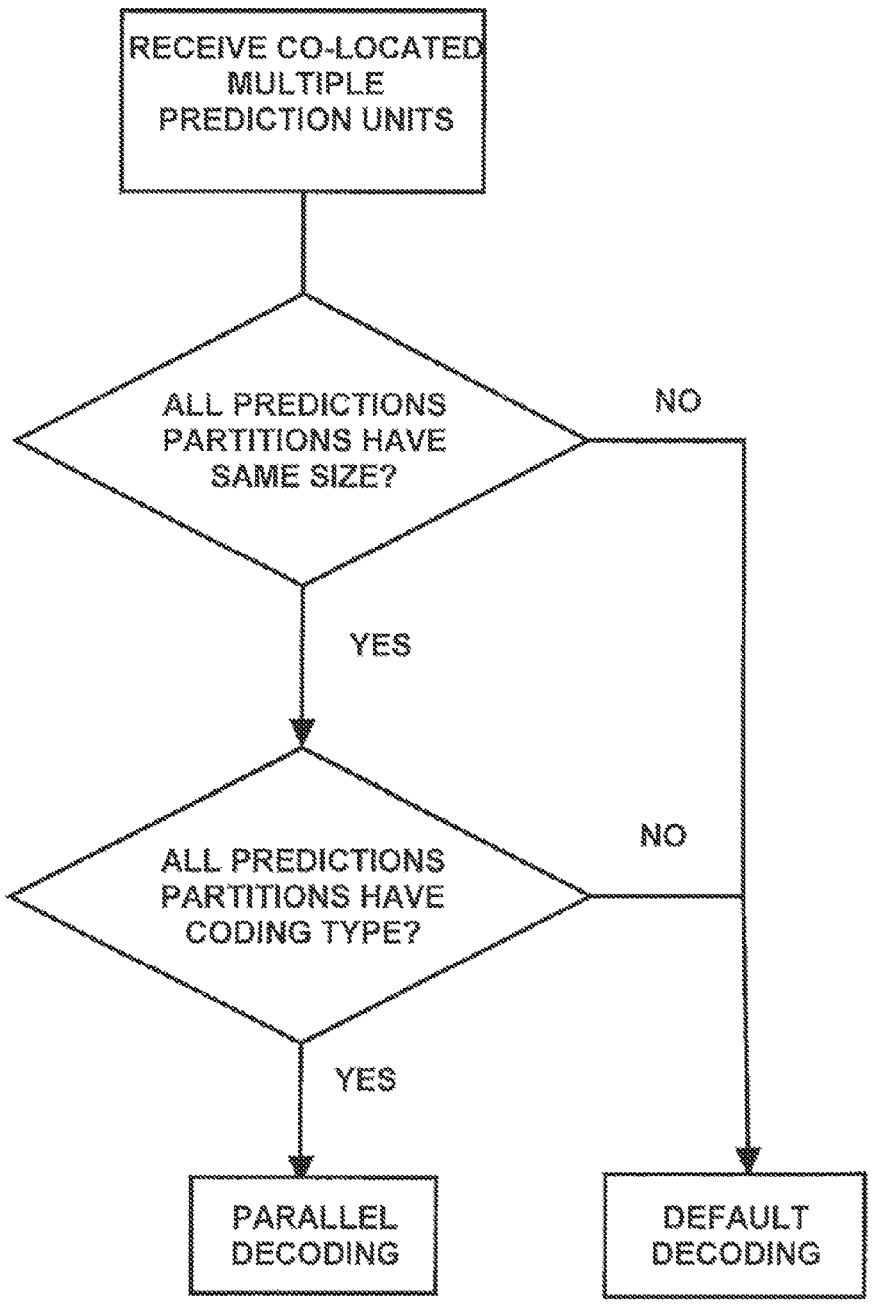
FIG. 13 illustrates tree based parallel decoding.

Referring to FIG. 12, in addition to the partitions having the same size, the system may further use parallel intra prediction across multiple prediction units that have prediction partitions that are of the same size and/or coding type (e.g., intra-coded vs. motion compensated). Referring to FIG. 13, these prediction units preferably be spatially co-located within a coding unit that was subsequently split to create the multiple prediction units. Alternatively, the multiple prediction units may be spatially co-located within a coding unit that was recursively split to create the prediction units. In other words, the prediction units have the same parent in the quad-tree.

Figure 14A:
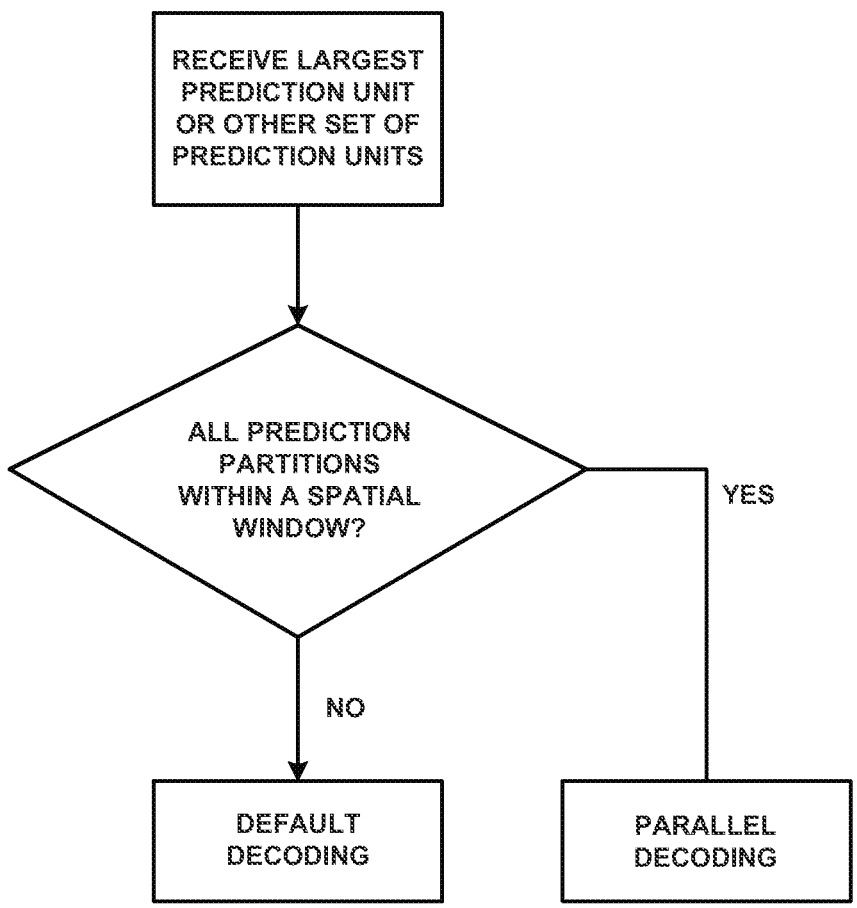
FIG. 14A illustrates spatial windows based parallel decoding.
Figure 14B:
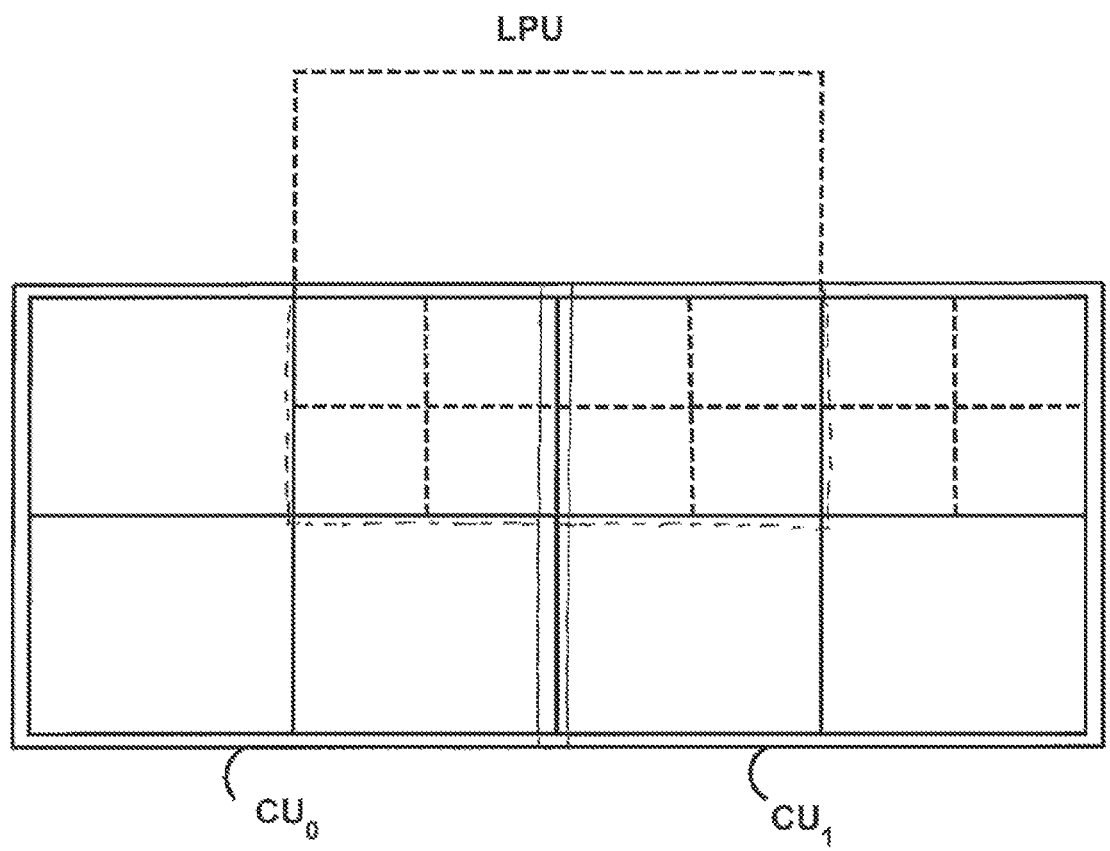
FIG. 14B illustrates the relationship between a window and a largest prediction unit.

In an embodiment the system may use parallel intra prediction across multiple coding units. The multiple coding units preferably have the same spatial size and prediction type (e.g., intra coded). Referring to FIG. FIGS. 14A and 14B, in another embodiment, the parallel intra prediction technique may be based on the size of the prediction area. For example, the system may restrict the use of the parallel intra prediction technique to pixels within an N×N spatial window. For example, the system may restrict use of the parallel intra prediction technique only to pixels within a 16×16 spatial window. Note that the data used for processing the pixels within the window may be located outside of the window.

As described above, the spatial window may be referred to as a parallel unit. Alternatively, it may be referred to as a parallel prediction unit or parallel coding unit. The size of the parallel unit may be signaled in the bit-stream from an encoder to a decoder. Furthermore, it may be defined in a profile, defined in a level, transmitted as meta-data, or communicated in any other manner. The encoder may determine the size of the parallel coding unit and restricts the use of the parallel intra prediction technology to spatial pixels that do not exceed the size of the parallel unit. The size of the parallel unit may be signaled to the decoder. Additionally, the size of the parallel unit by be determined by table look, specified in a profile, specified in a level, determined from image analysis, determined by rate-distortion optimization, or any other suitable technique.

For a prediction partition that is intra-coded, the following technique may be used to reconstruct the block pixel values. First, a prediction mode is signaled from the encoder to the decoder. This prediction mode identifies a process to predict pixels in the current block from previously reconstructed pixel values. As a specific example, a horizontal predictor may be signaled that predicts a current pixel value from a previously reconstructed pixel value that is near and to the left of the current pixel location. As an alternative example, a vertical predictor may be signaled that predicts a current pixel value from a previously reconstructed pixel value that is near and above the current pixel location. In general, pixel locations within a coding unit may have different predictions. The result is predicted pixel values for all the pixels of the coding unit.

Additionally, the encoder may send transform coefficient level values to the decoder. At the decoder, these transform coefficient level values are extracted from the bit-stream and converted to transform coefficients. The conversion may consist of a scaling operation, a table look-up operation, or any other suitable technique. Following the conversion, the transform coefficients are mapped into a two-dimensional transform coefficient matrix by a zig-zag scan operation, or other suitable mapping. The two-dimensional transform coefficient matrix is then mapped to reconstructed residual values by an inverse transform operation, or other suitable technique. The reconstructed residual values are added (or otherwise) to the predicted pixel values to form a reconstructed intra-predicted block.

The zig-zag scan operation and the inverse residual transform operation may depend on the prediction mode. For example, when a decoder receives a first prediction mode from an encoder for a first intra-predicted block, it uses the prediction process, zig-zag scan operation and inverse residual transform operation assigned to the first prediction mode. Similarly, when a decoder receives a second prediction mode from an encoder for a second intra-predicted block, it uses the prediction process, zig-zag scan operation and inverse residual transform operation assigned to the second prediction mode. In general, the scan pattern used for encoding and decoding may be modified, as desired. In addition, the encoding efficiency may be improved by having the scan pattern further dependent on which group of the parallel encoding the prediction units or prediction partitions are part of.

In one embodiment the system may operate as follows: when a decoder receives a first prediction mode from an encoder for a first intra-predicted block that is assigned to a first partition, the decoder uses the prediction process, zig-zag scan operation and inverse residual transform operation assigned to the first prediction mode and the first partition. Similarly, when a decoder receives a second prediction mode from an encoder for a second intra-predicted block that is assigned to a second partition, the decoder uses the prediction process, zig-zag scan operation and inverse residual transform operation assigned the second prediction mode and said second partition. For example, the first and second partitions may correspond to a first and a second group for parallel encoding. Note that for the case that the first prediction mode and the second prediction mode have the same value but the first partition and the second partition are not the same partition, then the first zig-zag scan operation and first inverse residual transform operation may not be the same as the second zig-zag scan operation and second inverse residual transform. This is true even if the first prediction process and second prediction process are the same. For example, the zig-zag scan operation for the first partition may use a horizontal transform and a vertical scan pattern, while the zig-zag scan operation for the second partition may use a vertical transform and a horizontal scan pattern.

There may be different intra prediction modes that are block size dependent. For block sizes of 8×8, 16×16, 32×32, there may be, for example, 33 intra prediction modes which provide substantially finer angle prediction compared to the 9 intra 4×4 prediction modes. While the 9 intra 4×4 prediction modes may be extended in some manner using some type of interpolation for finer angle prediction, this results in additional system complexity.

In the context of parallel encoding, including parallel encoding where the block sizes may have different sizes, the first set of blocks are generally predicted from adjacent macroblocks. Instead of extending the prediction modes of the 4×4 blocks to the larger blocks (e.g., 8×8, 16×16, 32×32, etc.), thereby increasing the complexity of the system, the system may reuse the existing prediction modes of the larger blocks. Therefore, the 4×4 block prediction modes may take advantage of the greater number of prediction modes identified for other sizes of blocks, such as those of 8×8, 16×16, and 32×32.

In many cases, the intra prediction modes of the 4×4 block size and prediction modes of the larger block sizes may be different. To accommodate the differences, it is desirable to map the 4×4 block prediction mode numbers to larger block prediction mode numbers. The mapping may be according to the prediction direction. For example, the intra prediction of a 4×4 block has 9 directional modes, while intra prediction of 8×8 block has 33 modes using angular prediction, intra prediction of block size 16×16 and 32×32 has 33 modes using arbitrary directional intra prediction (ADI). Angular prediction modes and the ADI prediction are show in FIG. 15 and FIG. 16, respectively. Even though the prediction modes of various blocks size may be different, for directional intra prediction, one mode may be mapped to another if they have the same or a close direction. For example, the system may map the value for mode 4 of the 4×4 block prediction to mode 9 of the 8×8 block prediction for the case that mode 4 related to a horizontal mode prediction and mode 9 related to a horizontal mode prediction.

To improve the prediction of a block the additional neighbors from the bottom and right may be used when available. Rather than extending the different prediction modes, the prediction from the bottom and the right neighbors may be done by rotating the block and then utilizing existing intra prediction modes. Predictions by two modes that are of 180 degree difference can be weighted interpolated as follows, $$p(y,x)=w*p1(y,x)+(1-w)p2(y,x)$$

where p1 is the prediction that doesn't include the bottom and right neighbors, and p2 is the prediction that doesn't include the above and left neighbors, and w is a weighting factor. The weighting tables may be the weighted average process between the predictions from above and left neighbors, and neighbors from bottom and right neighbors as follows:

First, derive value yTmp at pixel (x,y) as weighted average of p1 and p2, where weight is according to the distance to the above and bottom neighbors $$yTmp=(p1*(N-y)+p2*y)/N;$$

Second, derive value xTmp at pixel (x,y) as weighted average of p1 and p2, where weight is according to the distance to the left and right neighbors $$xTmp=(p1*(N-x)+p2*x)/N;$$

Third, the final predicted value at pixel (y,x) is a weighted average of xTmp and yTmp. The weight depends on the prediction direction. For each direction, represent its angle as (dx, dy), as represented in ADI mode in FIG. 16. For mode without direction, it is preferable to set dx=1, dy=1.

$$p(y,x)=(abs(dx)*xTmp+abs(dy)*yTmp)/(abs(dx)+abs(dy));$$

where N is the block width p1 is the prediction that doesn't include the bottom and right neighbors, and p2 is the prediction that doesn't include the above and left neighbors.

The encoder may make the decision on whether to perform weighted intra prediction or not, and signal the decision in the bitstream. A sample syntax for adding this weighted intra prediction flag is shown below. This may be signaled at coding unit level and/or prediction unit level where the parallel intra prediction occurs.

| coding_unit( x0, y0, currCodingUnitSize ) { | C | Descriptor |
|---|---|---|
| .... | | |
| split_coding_unit_flag | | (1) \| ae(v) |
| ... | | |
| alf_flag | 2 | u(1) \| ae(v) |
| if( split_coding_unit_flag ) { | | |
| splitCodingUnitSize = currCodingUnitSize >> 1 | | |
| x1 = x0 + splitCodingUnitSize | | |
| y1 = y0 + splitCodingUnitSize | | |
| if (is_parallel_unit) | 2 | u(1) \| ae(v) |
| weighted_bipred_flag | | |
| coding_unit( x0, y0, splitCodingUnitSize ) | 2 \| 3 \| 4 | |
| if( x1 < PicWidthInSamples$_L$ ) | | |
| coding_unit( x1, y0, splitCodingUnitSize ) | 2 \| 3 \| 4 | |
| if( y1 < PicHeightInSamples$_L$ ) | | |
| coding_unit( x0, y1, splitCodingUnitSize ) | 2 \| 3 \| 4 | |
| if( x1 < PicWidthInSamples$_L$ && y1 < PicHeightInSamples$_L$ ) | | |
| coding_unit( x1, y1, splitCodingUnitSize ) | 2 \| 3 \| 4 | |
| } else { | | |
| prediction_unit( x0, y0, currCodingUnitSize ) | 2 | |
| .... | | |
| } | | |
| } | | |

| prediction_unit( x0, y0, currPredUnitSize ) { | C | Descriptor |
|---|---|---|
| ...... | | |
| if( PredMode == MODE_INTRA ) { | | |
| planar_flag | 2 | u(1) \| ae(v) |
| if(planar_flag) { | | |
| ... | | |
| } | | |
| } else { | | |
| if(entropy_coding_mode_flag) | | |
| intra_split_flag | 2 | ae(v) |
| combined_intra_pred_flag | 2 | u(1) \| ae(v) |
| if (is_parallel_unit) | 2 | u(1) \| ae(v) |
| weighted_bipred_flag | | |
| for( i = 0; i < ( intra_split_flag ? 4 : 1 ); i++ ) { | | |
| prev_intra_luma_pred_flag | 2 | u(1) \| ae(v) |
| if( !prev_intra_pred_luma_flag ) | | |
| rem_intra_luma_pred_mode | 2 | ue(v) \| ae(v) |
| } | | |
| if( chroma_format_idc != 0 ) | | |
| intra_chroma_pred_mode | 2 | ue(v) \| ae(v) |
| } | | |
| else if( PredMode = MODE_INTER ) { | | |
| ... | | |
| } | | |
| } | | |

Semantics for the is_parallel_unit and weighted-bipred_flag may be defined as is_parallel_unit is true when currCodingUnitSize is less than or equal to ParallelUnitSize, where ParallelUnitSize is the size of the parallel prediction unit. weighted-bipred_flag equal to 1 defines the use of weighted bi-directional prediction for second pass units during intra-coding and equal to 0 defines the use of signal direction prediction for second pass units.

The intra prediction may be a weighted combination of an ADI prediction with a pixel-by-pixel mean prediction. Local mean is constructed as the average of reconstructed pixel values to the left, top-left, and above the current picture. While this is suitable for most of the image, it is problematic for the boundary pixels of the first set blocks of the parallel group, since such pixels may not be reconstructed.

One technique to account for boundary issues is to use the parallel unit neighbors to replace the unavailable pixels in the local mean calculation. For example, for the highlighted pixel in FIG. 17, the system may use AL' as the above left pixel, and use L' as the left pixel in the local mean calculation. These neighbors may be given different weights according to their distance to the pixel. In another embodiment, the system may use other available pixels in the adaptation, including those available from the ADI prediction and not yet processed by the combined intra prediction process. For example, for the highlighted pixel in FIG. 17, the system may include its above right pixel AR in the adaptation, and/or may also include its right pixel R, or bottom pixel, which are already predicted by ADI prediction, but not yet going through the combined intra process. In another embodiment, the combined intra prediction may be skipped for the boundary pixels of the first set blocks in parallel intra prediction.

Figure 18:
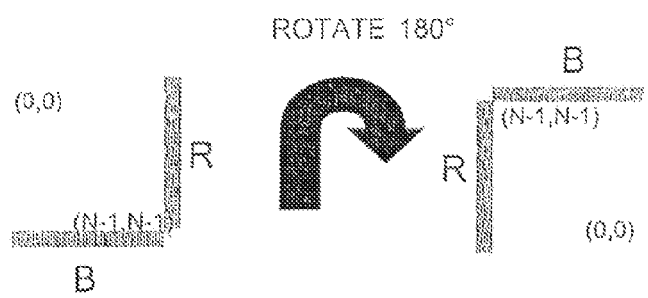
FIG. 18 illustrates block rotation.

Another technique for combined intra prediction with parallel intra prediction is to start the combined intra prediction from the bottom right pixel of a block if the right and bottom neighbors are available. This may be done by rotating the block, then performing the local mean adaptation and weighted average with the ADI or other types of intra prediction. The rotation process is illustrated below in FIG. 18. In another embodiment, the result of combined intra prediction started from the upper left corner of a block, and the result of combined intra prediction started from the bottom right corner of a block can be weighted average together.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for decoding video comprising:
   (a) decoding a first block of video using a plurality of second blocks of said video, where said plurality of second blocks of said video comprises blocks having different respective sizes relative to each other;
   (b) decoding a first group of said second blocks in a manner such that each of said first group of said second blocks is predicted independently of the other ones of said second blocks not included within said first group, and where prediction is based upon a first plurality of prediction directions;
   (c) decoding a second group of said second blocks in manner such that at least one block of said second group of said second blocks is predicted in a manner that is dependent on at least one block of said first group of said second blocks, where said first group of said second blocks does not include any blocks included in said second group of second blocks, and where prediction is based upon a second plurality of prediction directions different from said first plurality of directions;
   (d) wherein a prediction mode of a selected block from said second group of blocks is based upon a mapping that associates respective directions from said second plurality of directions with respective directions from said first plurality of directions.

2. The method of claim 1 wherein said first block is a 4×4 block.

3. The method of claim 2 wherein prediction modes of said first smaller block of pixels is mapped to said predefined set of prediction modes of said second larger block of pixels.

4. The method of claim 1 wherein each of said second blocks of said video have the same size.

5. The method of claim 1 wherein each of said second blocks of said video are predicted using the same technique.

6. The method of claim 2 wherein said size is signaled from within the bitstream by a flag.

7. The method of claim 4 wherein said decoding is capable of selecting the size of said second blocks having a non-uniform size.

8. The method of claim 1 wherein a plurality of said first group of said second blocks are predicted in parallel.

9. The method of claim 8 wherein a plurality of said second group of said second blocks are predicted in parallel.

10. The method of claim 9 wherein said first group is said decoded prior to said second group being said decoded.

11. The method of claim 1 wherein said second blocks of said video have the same prediction type.

12. The method of claim 1 wherein a scan order of a particular block of said first group of said second blocks having a particular prediction mode is dependent on being a member of said first group.

13. The method of claim 12 wherein a scan order of a particular block of said second group of said second blocks having a particular prediction mode is dependent on being a member of said second group.

14. The method of claim 1 wherein the predicting of at least one of said first group of said second blocks is modified at a boundary of said at least one of said first group.

15. The method of claim 1 wherein said decoder is capable of selecting the size of said second blocks having a non-uniform size.

* * * * *